(12) United States Patent
Segsworth et al.

(10) Patent No.: US 9,823,416 B2
(45) Date of Patent: Nov. 21, 2017

(54) TUBE REATTACHMENT

(71) Applicant: PGS Geophysical AS, Oslo (NO)

(72) Inventors: Matthew Segsworth, Austin, TX (US);
Jeremy Smith, Austin, TX (US);
Robert Alexis Peregrin Fernihough,
Austin, TX (US); Jeff Bowlus, Austin,
TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/169,146

(22) Filed: May 31, 2016

(65) Prior Publication Data

US 2017/0038533 A1 Feb. 9, 2017

Related U.S. Application Data

(60) Provisional application No. 62/202,247, filed on Aug. 7, 2015.

(51) Int. Cl.
*G02B 6/255* (2006.01)
*G02B 6/50* (2006.01)
*G02B 6/44* (2006.01)

(52) U.S. Cl.
CPC .......... *G02B 6/2558* (2013.01); *G02B 6/441* (2013.01); *G02B 6/4416* (2013.01); *G02B 6/4427* (2013.01); *G02B 6/4432* (2013.01); *G02B 6/506* (2013.01)

(58) Field of Classification Search
CPC ..... G02B 6/2558; G02B 6/4427; G02B 6/506
USPC ..................................................... 385/95–99
See application file for complete search history.

(56) References Cited

U.S. PATENT DOCUMENTS

| | | | | |
|---|---|---|---|---|
| 7,422,378 B2* | 9/2008 | Lu | ......................... | G02B 6/4475 385/103 |
| 7,590,321 B2* | 9/2009 | Lu | ......................... | G02B 6/4475 385/104 |
| 8,915,659 B2* | 12/2014 | Marcouiller | ......... | G02B 6/2551 385/95 |
| 2008/0013898 A1* | 1/2008 | Wells | .................... | G02B 6/4475 385/96 |
| 2008/0193091 A1* | 8/2008 | Herbst | ................. | G02B 6/4471 385/111 |
| 2009/0034917 A1* | 2/2009 | Burwell | ............... | G02B 6/2558 385/99 |
| 2010/0166370 A1* | 7/2010 | Cody | .................... | G02B 6/4475 385/48 |

(Continued)

OTHER PUBLICATIONS

Finishadapt, LLC, "FinishAdapt 154 Pinless Mini Range Fusion Splice Protector Sleeve", http://www.finishadapt.com/docs/154-range.pdf (accessed May 31, 2016), published at least as early as 2009 (according to "archive.org/web/").

*Primary Examiner* — Ellen Kim

(57) ABSTRACT

At least some illustrative embodiments are including a method exposing a first optical fiber and a second optical fiber disposed within an interior volume of a first tube. A splice is formed between the first optical fiber and a third optical fiber, the splice joining an end of the first optical fiber and an end of the third optical fiber. A second tube is disposed the first, second, third optical fibers and the splice between the first and third optical fibers, wherein an end of the second tube adjoins an end of the first tube to form a structure comprising either an overlapping structure; or an abutting structure.

8 Claims, 7 Drawing Sheets

(56) References Cited

U.S. PATENT DOCUMENTS

| | | | |
|---|---|---|---|
| 2013/0004122 A1* | 1/2013 | Kingsbury | G02B 6/4471 385/31 |
| 2014/0107630 A1* | 4/2014 | Yeik | G02B 6/001 606/5 |
| 2015/0234143 A1 | 8/2015 | Smith et al. | |

* cited by examiner

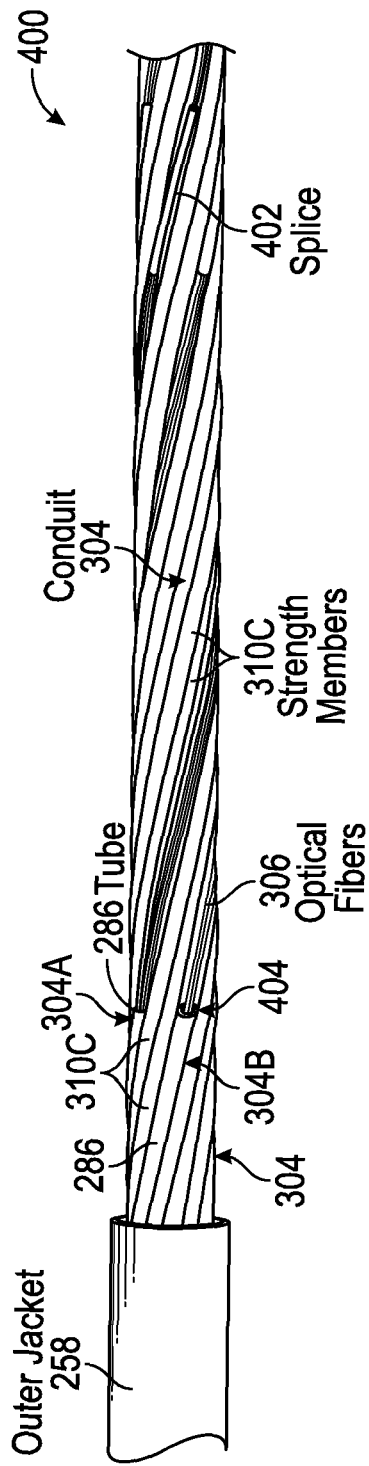
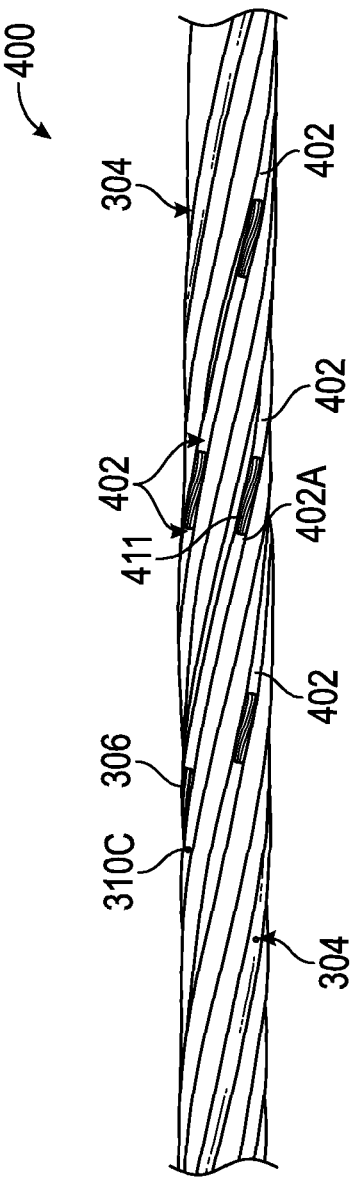
FIG. 4
FIG. 4A

TUBE REATTACHMENT

CROSS-REFERENCE TO RELATED APPLICATIONS

This application claims the benefit of U.S. Provisional Application Ser. No. 62/202,247 filed Aug. 7, 2015 and titled "Tube Reattachment". The provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., ocean, large lakes). Marine geophysical survey systems use a plurality of sensor cables, which contain one or more sensors to detect acoustic energy emitted by one or more sources and returned from a hydrocarbon reservoir and/or associated subsurface formations beneath the sea floor. Sensor cables, in some embodiments may comprise sensor streamers which may be towed through a water body by a survey vessel, and in other embodiments ocean bottom cables disposed on the sea floor or entrenched within the seabed.

In embodiments deployed on the sea floor or entrenched in the seabed, which may be referred to as permanent reservoir monitoring (PRM) systems, there can be water exposure for relatively long periods of time (e.g., months or years). For example, PRM systems may be designed for decades of operation in ultra-deep water (e.g., greater than 1500 m), while also remaining suitable for use at shallower depths. In such subsea applications based on optically-powered sensors and optical telemetry, conventional wisdom for such applications dictates the use of gel-filled stainless steel conduits for the optical fibers with robust hermetic seals at every connection and each of the sensor splices, which typically number in the hundreds and possibly the thousands. Each seal represents a cost and a potential failure location. Thus, mechanisms to reduce the need for such seals and splice encapsulations would be advantageous.

BRIEF DESCRIPTION OF THE DRAWINGS

For a detailed description of exemplary embodiments, reference will now be made to the accompanying drawings in which:

FIGS. 4 and 4A show a sensor cable in accordance with at least some embodiments;

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical and/or optical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean, when used in conjunction with a non-integer numerical value, ±10%.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
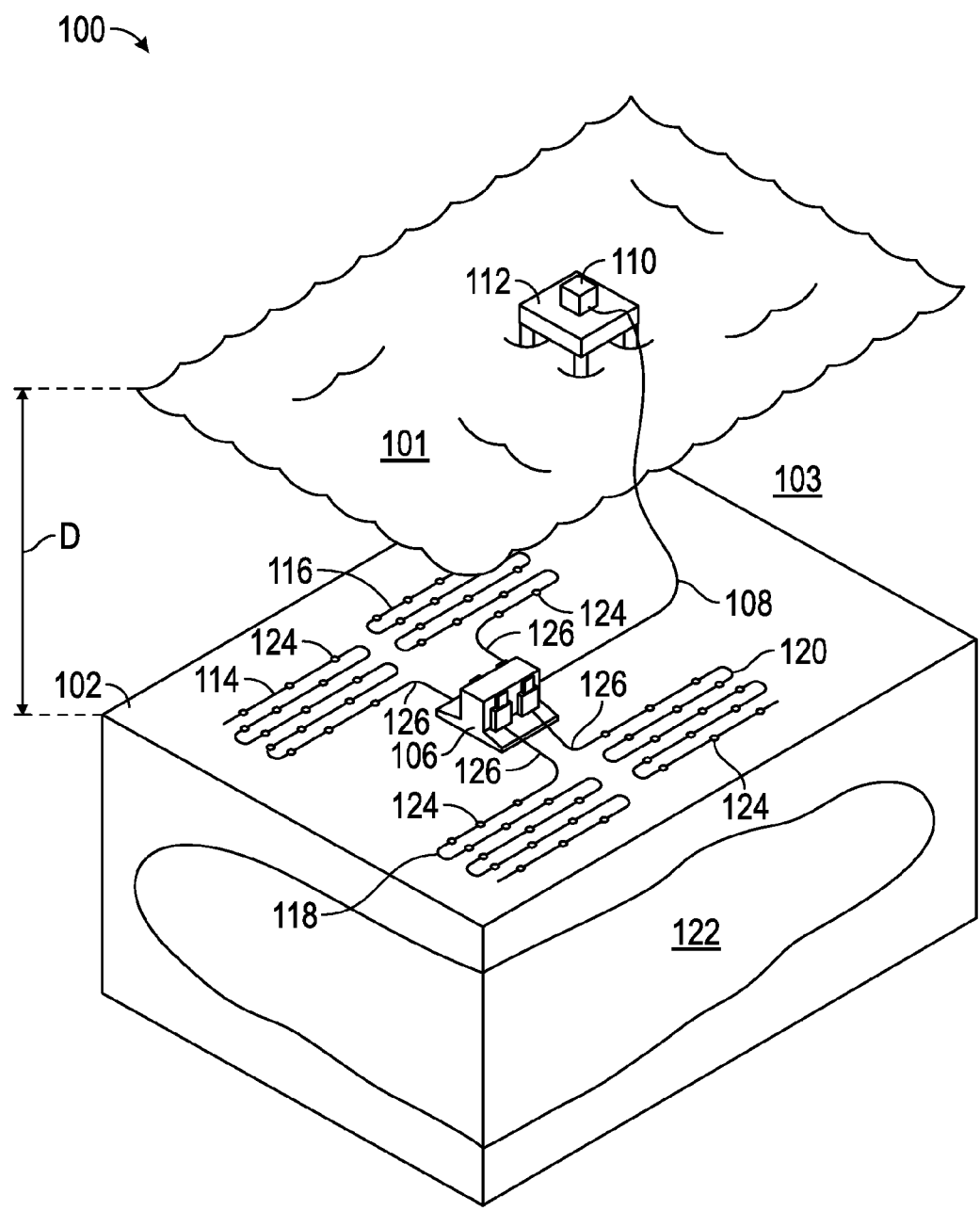
FIG. 1 shows a partial cutaway perspective view of a marine geophysical survey environment in accordance with at least some embodiments.

FIG. 1 shows a perspective cut-away view of a portion of a marine geophysical survey environment 100. Marine geophysical survey environment 100 may be used in conjunction with the exemplary cable embodiments described hereinbelow. FIG. 1 shows the surface 101 of the water. At a distance D below the surface 101 resides the sea floor 102, and below the sea floor 102 resides a hydrocarbon reservoir 122.

Within the environment of FIG. 1 a base unit 106 may be installed on sea floor 102 which mechanically and communicatively couples to an umbilical cable 108 that extends from the base unit 106 to a computer system 110 at the surface. Umbilical cable 108 may comprise an optical fiber link to computer system 110, or an optical fiber link and/or an electronic communication link. In the example system of FIG. 1, the computer system 110 may reside on a vessel 112 floating on the surface 101 of water body 103. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables 114, 116, 118 and 120 are communicatively coupled to the computer system 110.

Each of sensor cables 114, 116, 118 and 120 comprise a plurality of seismic sensors 124. For ease of illustration only fifteen seismic sensors 124 are shown associated with sensor cables 114, for example. However, in practice many hundreds or thousands of such devices may be spaced along the sensor cable 114. By way of example, sensors 124 may be spaced along a sensor cable 114 at intervals of about 50 meters. Further, in at least some embodiments, the spacing of sensors 124 may be in the range from 25 meters to 250 meters. However, the seismic sensors 124 need not be evenly spaced along the sensor cables, and extended portions of the sensor cables may be without seismic devices. For example, lead-in portions 126 may have expanses within which no seismic sensors are located. Each seismic sensor 124 may comprise a particle motion sensor and an acoustic pressure sensor, or hydrophone, or both. Further, in at least some embodiments, a particle motion sensor may detect particle motions along multiple directions, or axes. For example, at least some particle motion sensors may comprise so-called three-component, or three-axis particle motion sensors which detect particle motions along three, typically mutually-orthogonal, directions or axes. In at least some embodiments, seismic sensors 124 may be optically-based devices in which optical power supplied to the sensor via a corresponding one of sensor cables 114, 116, 118 and 120 is modulated by the sensor in response to a seismic acoustic wavefield, e.g. particle motion or acoustic pressure as the case may be, and returned to the vessel 112 via a sensor cable 114, 116, 118 and 120 and umbilical cable 108.

Figure 2:
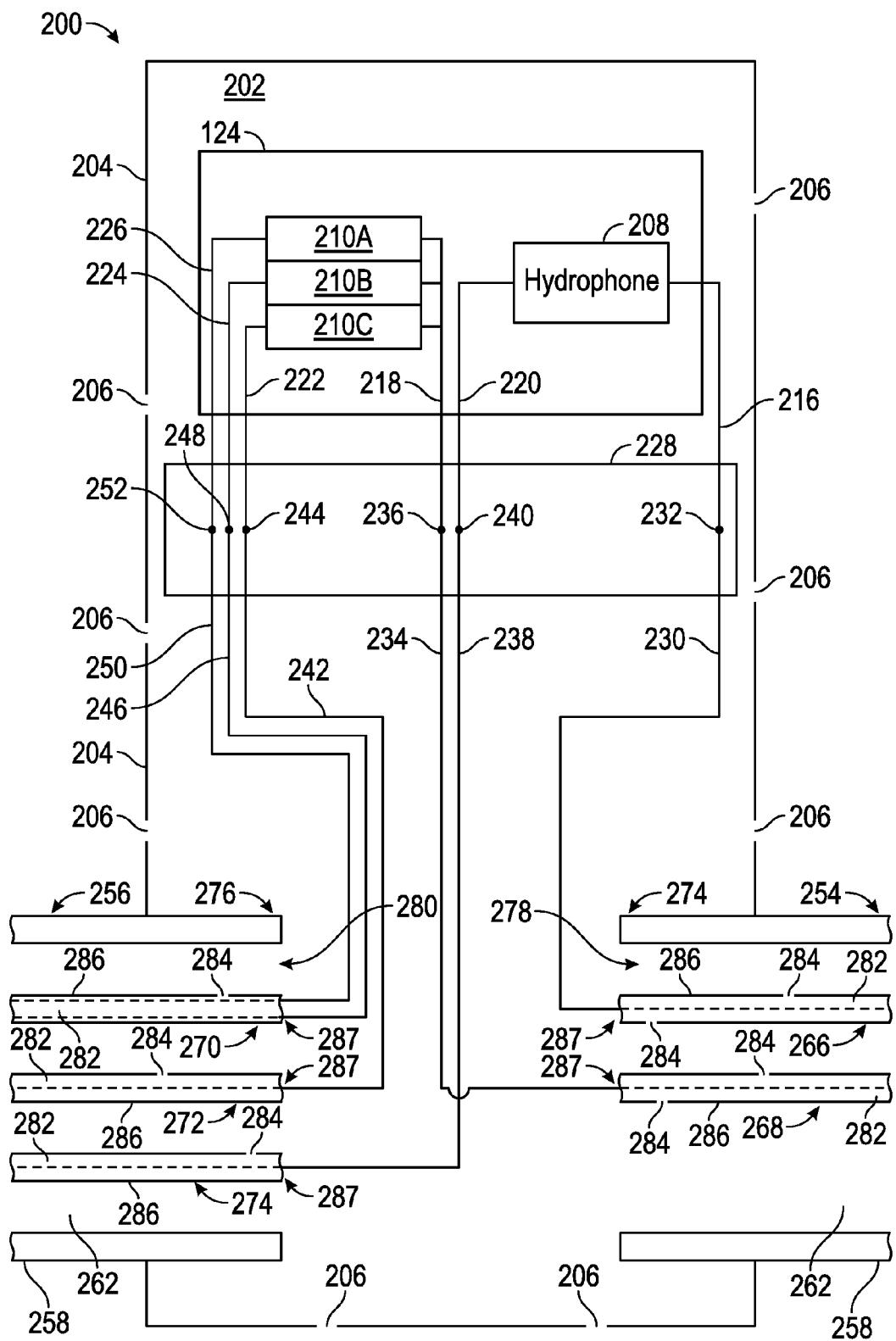
FIG. 2 shows a sensor module in accordance with at least some embodiments.

The coupling of seismic sensors to a sensor cable may be further understood by referring now to FIG. 2 showing a sensor module 200 in accordance with at least some embodiments. Sensor module 200 includes seismic sensor 124 disposed within interior volume 202 of an outer shell 204. As described further below, outer shell 204 may, when deployed within water body 103, admit sea water into interior volume 202 through, for example, ports 206 in outer shell 204. In other words, outer shell may not be watertight and when sensor module 200 is submerged in a water body 103, such as an ocean, sea water may flood interior volume 202 by entering through ports 206 in outer shell 204. Although eight ports 206 are shown for purposes of illustration, any suitable number of ports may be 206 in various embodiments of sensor module 200. In the exemplary embodiment in FIG. 2, seismic sensor 124 includes a hydrophone 208, and particle motion sensors 210A, B and C each of which may be sensitive to particle motions in one of three substantially mutually-orthogonal directions. Stated otherwise, particle motion sensors 210A-C together form a 3-axis particle motion sensor. Any suitable technology sensitive to particle motion may be used in conjunction with particle motion sensors 210A-C, such as geophones or accelerometers, for example.

As previously described, seismic sensors 124 may be optically-based devices. Thus, in at least some embodiments, optical power may be supplied to a seismic sensor 124 via optical fibers such as optical fiber 216 coupled to hydrophone 208 and optical fiber 218 coupled to particle motion sensors 210A-C. Optical power conveyed on optical fiber 218 may be split before being input to fluid motion sensors 210A-C, however, for ease of illustration optical devices which may be used therefor are not shown in FIG. 2. Optical signals bearing seismic data output by hydrophone 208 and particle motion detectors 210A-C are conveyed on corresponding ones of optical fibers 220, 222, 224 and 226.

Optical fibers 216-226 may be coupled to sensor cables to receive optical power from a base unit 106 or vessel 112, say, and return optical signals from seismic sensor 124 thereto. By way of example, optical fibers 216-226 may be spliced to optical fibers within a sensor cable at a splice pad 228. Thus, in the exemplary embodiment of a sensor module 200 in FIG. 2, optical fiber 216 is spliced to optical fiber 230 at splice 232. Similarly, optical fiber 218 is spliced to optical fiber 234 at splice 236, optical fiber 220 is spliced to optical fiber 238 at splice 240, optical fiber 222 is spliced to optical fiber 242 at splice 244, optical fiber 224 is spliced to optical fiber 246 at splice 248, and optical fiber 226 is spliced to optical fiber 250 at splice 252.

Optical fibers 230, 234, 238, 242, 246, and 250 may be contained within respective segments of a sensor cable. Thus, for example, optical fibers 230 and 234 may be contained within sensor cable segment 254. Similarly, optical fibers 238, 242, 246 and 250 may be contained within sensor cable segment 256. Further, each sensor cable segment may comprise an outer jacket, for example outer jacket 258 of sensor cable segments 254 and 256. Optical fibers within a sensor cable segment may be disposed within a conduit that itself is disposed within an interior volume of the sensor cable segments. The interior volume is defined by the outer jacket of the sensor cable segment. Thus, outer jacket 258 of sensor cable segment 254 and 256 define an interior volume 262 of each sensor cable segment. In the example sensor cable segment 254, conduit 266 disposed within interior volume 262 carries optical fiber 230 and conduit 268 carries optical fiber 234. Similarly conduits 272 and 274 disposed within interior volume 262 of sensor cable segment 256 carry optical fibers 242 and 238, respectively. Each conduit 266, 268, 272 and 274 comprises a tube 286 having a wall which defines the interior volume 282 thereof and concomitantly an interior volume of the conduit. To access the optical fibers within the conduits, the tubes 286 are broken as shown. Although conduits 266, 268, 272 and 274 are shown as carrying a single fiber for ease of illustration, such conduits may carry a plurality of optical fibers. For example, conduit 270 disposed within interior volume 262 of sensor cable segment 256 is shown carrying optical fibers 246 and 250, however, such conduits may typically include about four fibers, as described further below in conjunction with FIG. 3. Moreover, the principles of the disclosure do not implicate a particular number of optical fibers. Further, sensor cable segments 254, 265 may include other structures also described further below.

Ends 274 and 276 of sensor cable segments 254 and 256 may extend through outer shell 204 and into interior volume 202 of outer shell 204. Further, openings 278 and 280 in ends 274 and 276, respectively, may expose the interior volume 262 to the fluid, e.g., sea water, contained within interior volume 202 when sensor module 200 is deployed and allow the fluid to flood the interior volume 262.

Fluid admitted into the interior volumes of the sensor cable segments may flow into and flood interior volumes 282 of conduits 266, 268, 270, 272 and 274 via perforations, or vents, 284 in the tubes 286, and via broken ends 287. In this way, a pressure balanced configuration may be provided in which no pressure differential exists across tubes 286.

Figure 3:
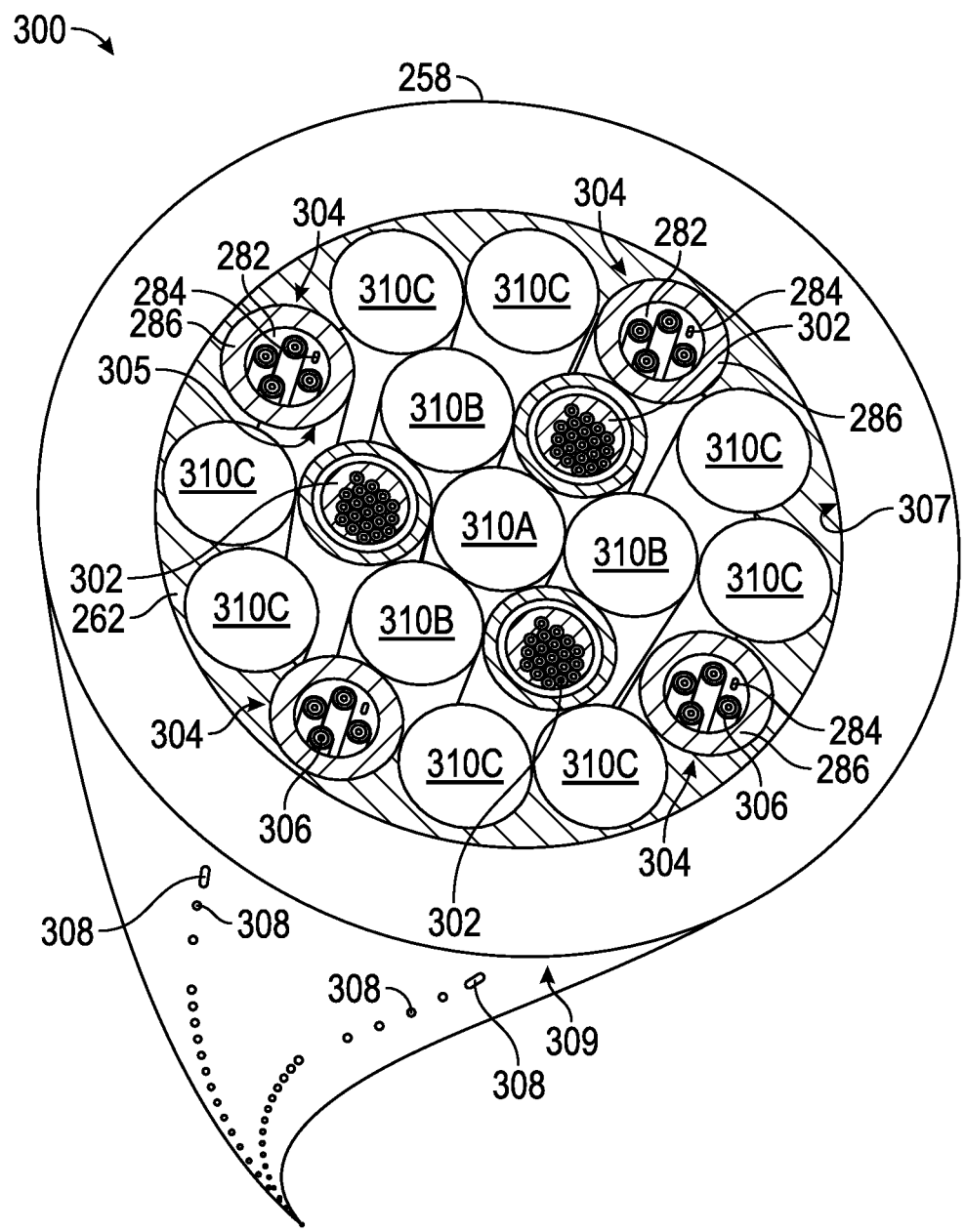
FIG. 3 shows a sensor cable in accordance with at least some embodiments.

The foregoing may be further appreciated by referring to FIG. 3 illustrating a sensor cable 300 in accordance with at least some embodiments. Sensor cable 300 may be exemplary of embodiments of sensor cable segments 254, 256. Sensor cable 300 also includes, disposed within interior volume 262, strength members 310. Strength members 310 may comprise, for example, galvanized steel wire, however any suitable wire or strand materials that provide adequate design strengths may be used. In the example sensor cable 300, disposed about a central strength member 310A are three strength members 310B intertwined with three sealed optical fiber conduits 302. Disposed about the intertwined strength members 310B and sealed optical fiber conduits 302 are four floodable optical fiber conduits 304, and strength members 310C. Floodable optical fiber conduits 304 include four optical fibers 306 disposed within an interior volume 282 and tube 286 having an annular wall defining interior volume 282. Tubes 286 may also be referred to as "loose tubes." Tubes 286 may have, in at least some embodiments, an inner diameter of about 2 millimeters and an outer diameter of about 3 millimeters. Although four optical fibers are shown by way of example, other numbers of optical fibers may be enclosed in a tube 286.

Tubes 286 include vents 284 for the ingress of a fluid into interior volume 282 as described above. Tubes 286 comprise an annular wall including vents 284 passing between an outer surface 305 and interior volume 282. Vents 284 allow for the ingress of a fluid into interior volume 282 as described above. Tubes 286 may comprise a plastic material, e.g. polypropylene or polyvinylidene fluoride (PVDF), or a metal such as stainless steel or other non-corrosive metal, e.g. brass. Exemplary materials suitable for tubes 286 are described in the commonly-owned, co-pending U.S. Patent Publication No. 2015/0234143 titled Subsea Cable Having Floodable Optical Conduit" which is hereby incorporated by reference as if fully reproduced herein. Floodable optical fiber conduits 304 may be exemplary of conduits 266, 268, 268, 272 and 274. Outer jacket 258 comprises inner surface 307 and an outer surface 309, and defines an interior volume 262 bounded by inner surface 307. Further, perforations, or vents, 308 may also be provided in the outer jacket 258, which vents pass between the outer surface 309 and the inner surface 307 to the interior volume 262. The vents 308 provide for fluid communication between a water body and interior volume 262 and allow for the ingress of a fluid such as sea water into the interior volume 262. Thus, in addition to fluid entering interior volume 262 via ends of sensor cable segments as described above, in at least some embodiments a fluid such as sea water may be admitted through vents 308. Further, as a sensor cable comprising portions 300 is deployed in the sea say, sea water may either compress or displace any gas, such as air, entrained in interior volume 262 and expel it through other vents 308. Likewise, the sea water may flow through vents 284 in tubes 286 into interior volume 282 thereof thereby flooding floodable optical fiber conduits 304 and compressing or displacing any entrained gas, e.g. air, which may be also be expelled through other vents 284. Thus, a pressure-balanced configuration for the sensor cable segment may be realized.

As described in conjunction with FIG. 2, it may be desirable to break into a conduit within a sensor cable to gain access to one or more optical fibers disposed therein. In the example of FIG. 2, access to the optical fibers facilitated coupling of sensor modules to the sensor cable. In related art systems, such connections typically use spare conduits and extensions spliced onto the fibers therein, which can be costly and time consuming. Further, repair of broken optical fibers may be similarly effected in related art systems. Techniques for splicing optical fibers within a conduit are described the commonly-owned, co-pending U.S. patent application Ser. No. 15/169,105, filed May 31, 2016, titled "Staggered Optical Fiber Splices" (PGS-15130-US-ORG1), U.S. Patent Application Publication No. 201710038551 which is hereby incorporated herein by reference as if fully set forth herein. These techniques may be used in conjunction with the principles disclosed herein. To appreciate these principles as described in conjunction with exemplary embodiments, turn next to FIG. 4.

Figure 5:
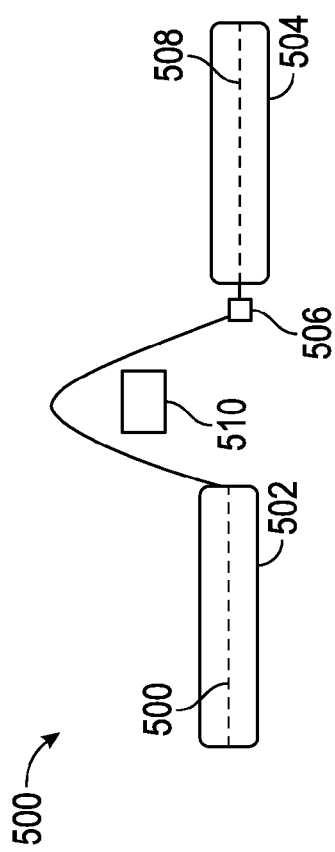
FIG. 5 shows an optical fiber extension in accordance with at least some embodiments.

FIG. 4 shows a view of a cutaway sensor cable 400 further illustrating the intertwined relationship of the components within the sensor cable of FIG. 3, and conduits having a part of the respective tubes cut away to gain access to the optical fibers therein. Sensor cable 400 may illustrate an exemplary embodiment of a sensor cable segment 254, 256 (FIG. 2B). In FIG. 4, outer jacket 258 is shown cutaway to expose structures within sensor cable 400 including strength members 310C and optical fiber conduits 304. Further, in FIG. 4 it is seen that in at least some embodiments of a sensor cable, the strength members and conduits are helically wound within the interior volume (not visible in FIG. 4) of the sensor cable. To access the optical fibers within an interior volume of a tube 286, a portion of the tube 286 (comprising optical fiber conduits 304A and 304B in the example in FIG. 4), has been cut away, exposing at least a portion of optical fibers 306 extending past an end 404 of the tube 286. In this way, an extension may be spliced onto an optical fiber 306, for example, to couple the optical fiber to a sensor module, as described above, or to repair a broken optical fiber. An exemplary splice 402 is shown in FIG. 4, and additional splices 402 are shown in FIG. 4A showing another portion of sensor cable 400. Optical fibers 411 comprise an optical fiber spliced to one of optical fibers 306 at splice 402A. A splice between optical fibers may be formed as described in the aforementioned U.S. patent application Ser. No. 15/169, 105 (PGS-15130-US-ORG1), U.S. Patent Application Publication No. 2017/0038551 wherein the ends of the spliced optical fibers are disposed within a sleeve, and not visible in FIG. 4. Further optical fibers may be spliced to extend a fiber in a cut tube as shown in FIG. 5, which schematically illustrates an optical fiber extension 500 that spans a distance between two cut tubes 502 and 504 and a sensor pad 510 therebetween. For example, optical fiber extension 500 may be blown through tube 502 in response to tube 502 being cut or "broken" and spliced, 506, onto an optical fiber 508 in tube 504.

Once a tube comprising a conduit 304 has been cut, exposing the optical fibers therein, the optical fibers and any splices joining optical fibers, some mechanism to provide protection to the optical fibers and structural integrity to the splices may be employed. In related art systems, for example, a splice may be enclosed in a casing and/or encapsulation compound. However, the diameter of such approaches may hinder their use in a sensor cable, particularly a sensor cable in a subsea environment. A mechanism to reconstitute a tube that has been broken (cut into) in accordance with at least some embodiments will now be described in conjunction with FIG. 6.

Figure 6:
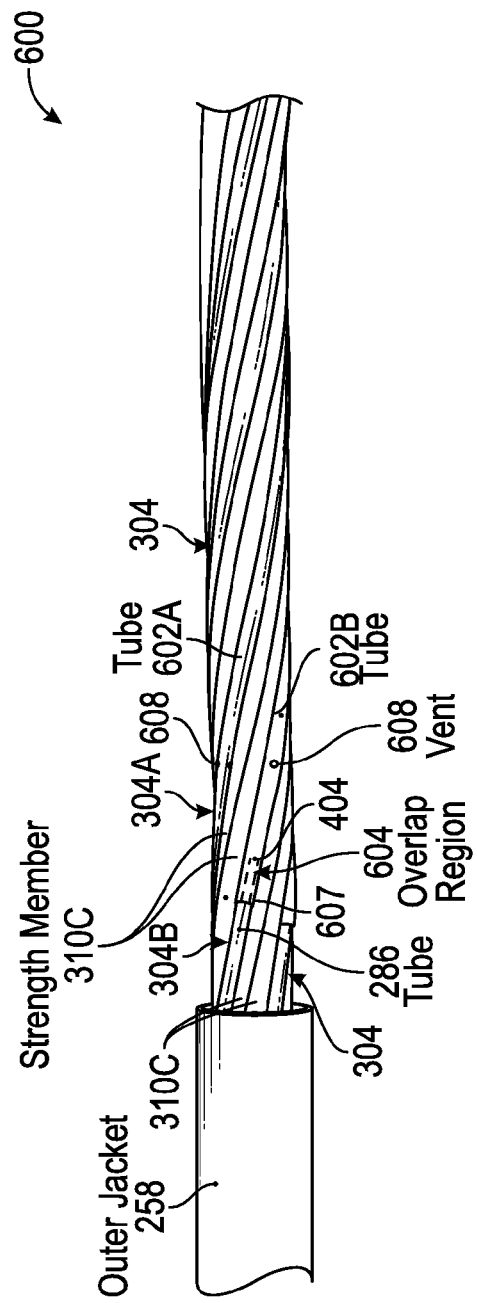
FIG. 6 shows a sensor cable in accordance with at least some embodiments.

FIG. 6 shows a view of a cutaway sensor cable 600. Sensor cable 600 includes conduits 304, in which portions of tubes 286 comprising conduits 304A, B have been broken to expose the enclosed optical fibers (not shown in FIG. 6) as previously described. Tubes 286 in these conduits have been reconstituted with tubes 602A, B placed over the previously exposed optical fibers and splices therebetween (not visible in FIG. 6). Tubes 602A, 602B may be disposed about the portion of an optical fiber 306, FIGS. 4,4A, extending past the end 404 of a tube 286 and splice 402, FIG. 4, and an optical fiber spliced thereto at splice 402, FIG. 4, similar to one of optical fibers 411, FIG. 4A. Tubes 602A, B may be metallic, for example a tube 602A, B, may be made of stainless steel. However, other metals, such as brass or other non-corrosive metal may be used. Further in at least some embodiments an end of a tube 602A, 602B, e.g. end 607 of tube 602B, may adjoin the end of the broken tube, e.g. end 404. In at least some embodiments, the end of a tube 602A, 602B may abut an end of the broken tubes 286 or, alternatively, end 607 may overlap a broken tube 286, as shown by overlap region 604. Stated otherwise, an end of a tube 286 and an end of a tube 602A, 602B may, in at least some embodiments form an abutting structure, and in at least some other embodiments form an overlapping structure. Further, tubes 602A, 602B may include one or more vents 608 for the ingress of seawater, say, into an interior volume (not visible in FIG. 6) of the tubes, as previously described.

Figure 6A:
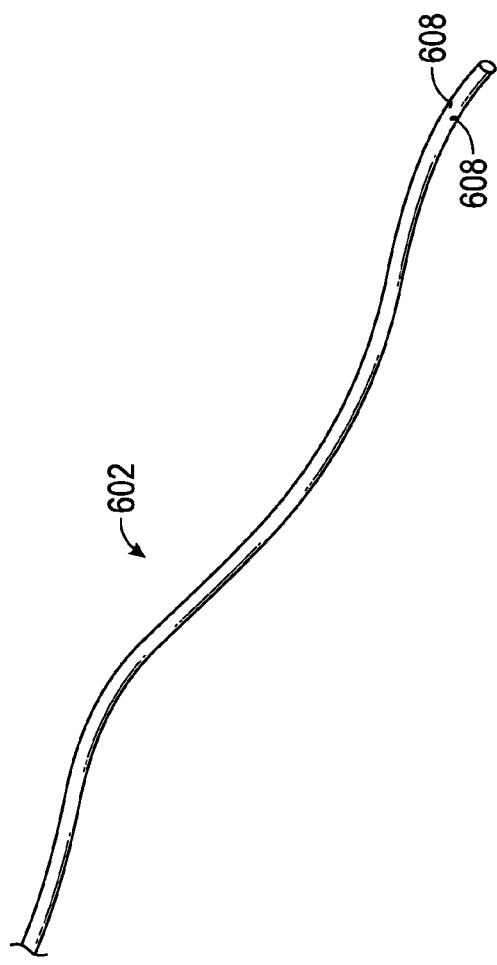
FIG. 6A shows a portion of a sensor cable as in FIG. 6 in accordance with at least some embodiments.

The reconstitution of tubes 602A, 602B may also facilitate the use of pinless splice protectors in conjunction with splices 402 (not shown in FIG. 6) inasmuch as the metallic tube provides sufficient support that a reinforcing pin may not be required to add rigidity to the splice protector. Splices employing pinless splice protectors have been described in the aforementioned U.S. Patent Application titled "Staggered Optical Fiber Splices". Further, a metallic tube 602A, 602B may have a smaller wall thickness than tubing made of plastic which may, in turn, allow for a larger internal diameter than in a plastic tube. For example, an interior volume (not visible in FIG. 6) of a tube 602A, 602B enclosing the splice and the two fibers having abutting ends joined at the splice may have an internal diameter in the range of about 1.5 millimeters to 5 millimeters. By way of example, in an embodiment having an overlapping structure, the internal diameter of a tube 602A, 602B may be smaller than the outside diameter of a tube 286, such that the overlapping portions of tube 602602B and 286 in overlap region 604 form a press fit. The foregoing dimensions are exemplary and other embodiments of a tube 602A, 602B may have different internal diameters. The larger inner diameter can allow for space for the passing of fiber over splices and the passing of splices over each other. Still further, a tube 602A, 602B may comprise a helical preform matching the helical pitch of the other cable members, e.g. conduits 304, strength members 3100, in sensor cable 600. Stated otherwise, a tube 602A, 602B may comprise a tube formed having a helical shape matching the pitch of the other members of a sensor cable 600. This may be seen in FIG. 6A showing a tube 602 comprising a helical preform having a helical shape as previously described. Two vents 608 are also shown. In this way, the reconstituted tubes 602A, 602B may be disposed in the space, or groove, within a sensor cable 600 previously occupied by the respective cut tube 286 defined by the other cable members within a sensor cable 600.

Figure 6B:
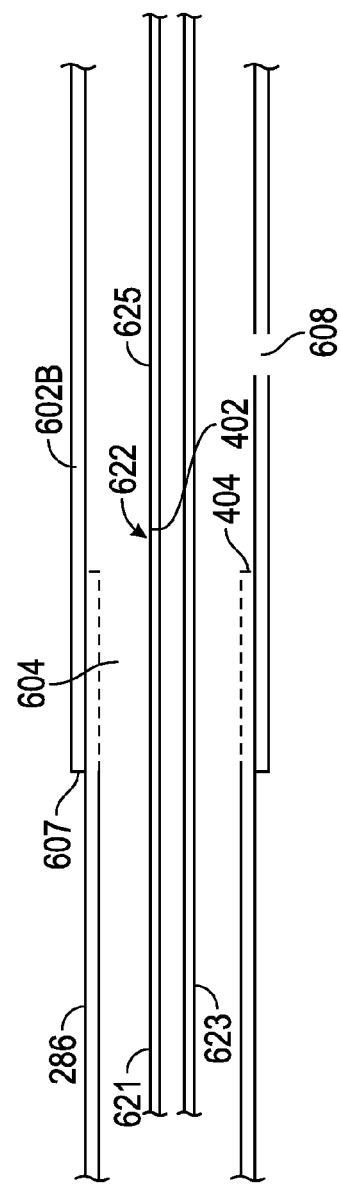
FIG. 6B shows a portion of a sensor cable as in FIG. 6 in accordance with at least some embodiments.

This may be further understood by referring to FIG. 6B showing an expanded, cutaway view of a portion of the sensor cable 600. In FIG. 6B, optical fibers, 621, 623 and 625 are shown of ease of illustration. Also for simplicity, the helical form of tube 602B in FIG. 6 has been omitted. Optical fiber 621 is disposed within broken tube 286, and an end 622 thereof exposed when tube 286 is broken. A second optical fiber 623 which may have a length extending past the end 404 of tube 286 may be exposed when tube 286 is broken but then be enclosed in reconstituted tube 602B. Optical fiber 621 may be extended by the third optical fiber 625 spliced onto the end 404 of optical fiber 621 at a splice 402. Splice 402 is shown without a sleeve. In other embodiments, a sleeve may be used, as previously described. Optical fiber 625 is also disposed within reconstituted tube 602B.

Figure 7:
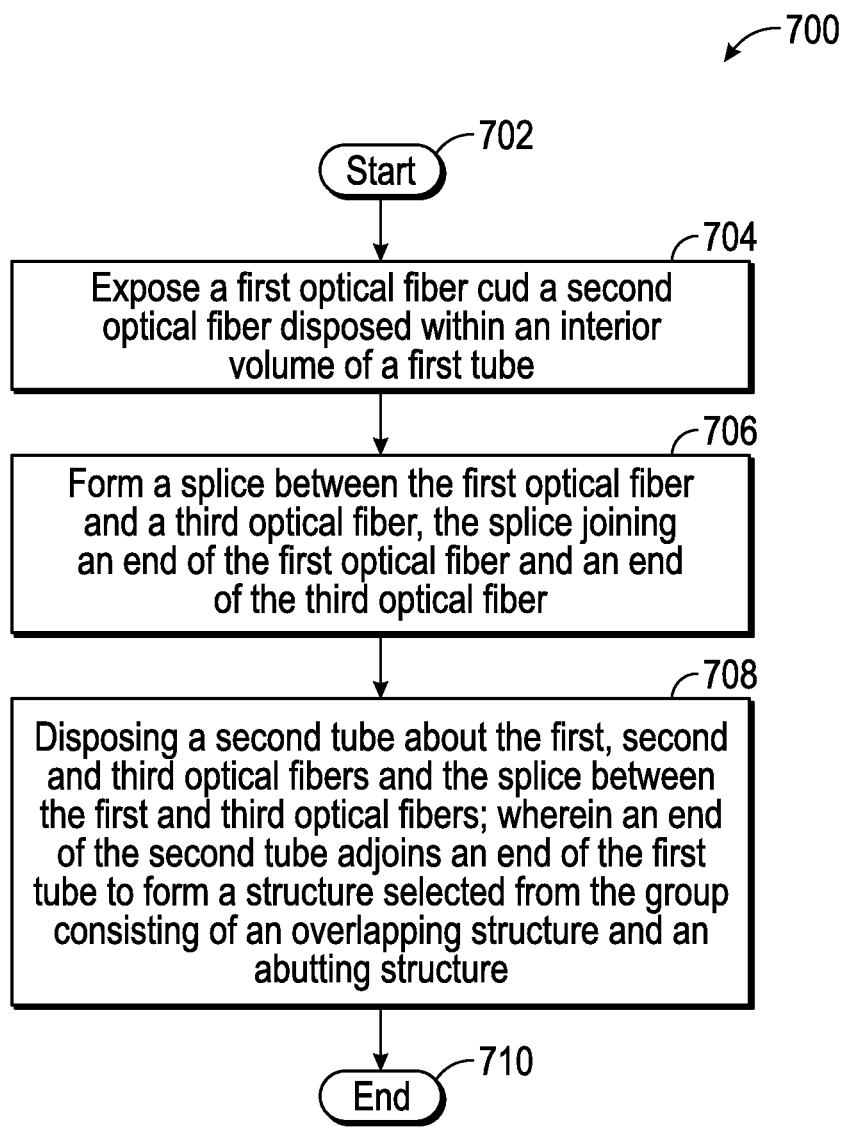
FIG. 7 shows a flowchart of a method in accordance with at least some embodiments.

FIG. 7 shows a flowchart of a method 700 In accordance with another embodiment of the disclosure. Method 700 starts at block 702. At block 704, first and second optical fibers disposed within an interior volume of a first tube are exposed. The first and second optical fibers may be exposed by, for example, severing a wall of the first tube, the severing forming a severed portion of the first tube, and removing the severed portion from about the first and second optical fibers, thereby gaining access to the first and second optical fibers. A splice is formed between the first optical fiber and a third optical fiber, block 706. The splice joins an end of the first optical fiber and an end of the third optical fiber. The splice may be formed as described above in conjunction with FIGS. 3 and 6. A second tube is disposed about the first, second and third optical fibers and the splice between the first and third optical fibers, block 708. An end of the second tube adjoins an end of the first tube forming, in at least some embodiments an abutting structure and in at least some other embodiments an overlapping structure, as describe above in conjunction with FIG. 6. Further, in some embodiments, the first tube may be plastic and the second tube may be metallic, for example comprising a non-corrosive metal such as stainless steel, also described above. Further, the second tube may comprise a helical preform such that the second tube may be disposed within a groove formed by cable members within a sensor cable. Such cable members can include a floodable optical fiber conduit having vents in a wall thereof, a sealed optical fiber conduit and a strength member, as described above in conjunction with FIGS. 3 and 4. Method 700 ends at block 710.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, sensor cables may include different numbers of conduits, and various numbers of tube reattachments in accordance with the principles of the example embodiments may be effected within a sensor cable. It is intended that the following claims be interpreted to embrace all such variations and modifications.

What is claimed is:
1. A method comprising:
    exposing a first optical fiber and a second optical fiber disposed within an interior volume of a first tube;
    forming a splice between the first optical fiber and a third optical fiber, the splice joining an end of the first optical fiber and an end of the third optical fiber;
    disposing a second tube about the first, second, third optical fibers and the splice between the first and third optical fibers the second tube comprises a wall defining an interior volume thereof, the first, second and third optical fibers and the splice between the first and third optical fibers disposed within the interior volume, and the wall comprises one or more vents extending from an outer surface of the wall to the interior volume of the second tube wherein an end of the second tube adjoins a broken end of the first tube to form a structure selected from the group consisting of: an overlapping structure; and an abutting structure.

2. The method of claim 1 wherein the first tube comprises a plastic.

3. The method of claim 2 wherein the first tube comprises a wall defining the interior volume, the exposing comprising:
   severing the wall of the first tube, the severing forming the broken end and a severed portion of the first tube; and
   removing the severed portion of the first tube from about the first and second optical fibers.

4. The method of claim 1 wherein the second tube comprises a helical preform configured to conform to a groove defined by a plurality of cable members within a sensor cable.

5. The method of claim 4 wherein each of the plurality of cable members is selected from the group consisting of:
   a floodable optical fiber conduit having one or more vents in a wall thereof;
   a strength member; and
   a sealed optical fiber conduit.

6. The method of claim 4 further comprising inserting the preform into the groove defined by a plurality of cable members within a sensor cable.

7. The method of claim 1 wherein the interior volume of the second tube has a diameter in the range of 1.5 millimeters to 5.0 millimeters.

8. An apparatus comprising:
   a first tube having an interior volume;
   a first optical fiber disposed within the interior volume and having a portion extending past an end of the first tube;
   a second optical fiber having an end abutting an end of the portion of the first optical fiber extending past the end of the first tube, the abutting ends of the first and second optical fibers having a splice therebetween; and
   a second tube disposed about the portion of the first optical fiber extending past the end of the first tube, the splice and the second optical fiber, the second tube having an end adjoining the end of the first tube;
   wherein:
      the second tube comprises a wall defining an interior volume; and wherein:
         the portion of the first optical fiber extending past the end of the first tube, the splice and a portion of the second optical fiber proximal to the splice are disposed within the interior volume of the second tube; and
         the wall comprises one or more vents extending between an outer surface of the wall and the interior volume.

* * * * *